United States Patent [19]

Krumwiede et al.

[11] Patent Number: 4,536,205

[45] Date of Patent: Aug. 20, 1985

[54] METHOD FOR CONTROLLING CURRENTS IN GLASS MELTER

[75] Inventors: John F. Krumwiede, Indiana Township, Allegheny County; William C. Harrell, Buffalo Township, Butler County; William G. Hilliard, Lower Burrell, all of Pa.; James E. Harris, Wichita Falls, Tex.

[73] Assignee: PPG Industries, Inc., Pittsburgh, Pa.

[21] Appl. No.: 633,559

[22] Filed: Jul. 23, 1984

Related U.S. Application Data

[62] Division of Ser. No. 543,735, Oct. 20, 1983.

[51] Int. Cl.$^3$ ............................................. C03B 5/18
[52] U.S. Cl. .......................................... 65/135; 65/178
[58] Field of Search ......................... 65/134, 135, 178

[56] References Cited

U.S. PATENT DOCUMENTS 2,387,222 10/1945 Wright .................................. 65/135
3,104,967 9/1963 Beck et al. ........................... 65/178
3,414,396 12/1968 Brichard ............................. 65/134

FOREIGN PATENT DOCUMENTS 637253 2/1962 Canada ................................ 65/178

Primary Examiner—Robert Lindsay
Attorney, Agent, or Firm—Dennis G. Millman

[57] ABSTRACT

In a glass melting furnace, the beneficial effects of passing molten glass streams through the intensified heating at the surface of the "spring zone" are enhanced by the use of bubblers. In one aspect, the rate of bubbling is greater near a side wall of the furnace than in the center immediately upstream of the spring zone so as to direct side portions of the throughput stream into the spring zone. In another aspect of the invention, the rising currents of the spring zone are enhanced by bubbling a stream entering the spring zone at a first elevation and then bubbling the same stream portion at a higher elevation.

9 Claims, 2 Drawing Figures

METHOD FOR CONTROLLING CURRENTS IN GLASS MELTER

This is a division of application Ser. No. 543,735 filed Oct. 20, 1983.

BACKGROUND OF THE INVENTION

This invention relates to the melting of glass and particularly to the use of bubblers to control the currents of molten glass in a melting furnace.

In a glass melting furnace of the continuous type a body of molten glass is maintained in the furnace and raw glass batch materials are fed through an inlet at one end of the furnace onto the surface of the pool of molten glass. There, the batch materials form an unmelted layer or "blanket" on the surface of the molten glass pool which may extend a considerable distance into the furnace until it becomes melted into the pool of molten glass. Heat for melting the batch is provided within the furnace by combustion burners above the level of the molten glass, sometimes aided by submerged electric heating means. At the opposite end of the furnace from the inlet end, melted glass is withdrawn from the pool of molten glass through an outlet opening.

The batch blanket at the inlet end of the melting furnace is relatively cold and acts as a heat sink and also shields the underlying portion of the molten glass pool from radiant heat from the overhead combustion. On the other hand, the region of the molten glass pool just downstream from the location where the batch blanket is melted tends to be the hottest region in the molten glass pool. These temperture conditions create two counter-rotating circulation cells in the molten glass pool. The tendency of the hot glass in the region just beyond the batch blanket to rise, and the tendency of relatively cool glass near the inlet end to sink, establish a circulation pattern beneath the batch blanket wherein glass in the upper portion of the pool beneath the blanket flows toward the inlet end (i.e., in the upstream direction) and glass in the lower portion of the pool under the batch blanket flows toward the outlet (i.e., in the downstream direction). Between the end of the batch blanket and the outlet end of the furnace the circulation pattern is in the opposite direction, with the surface portion of the glass flowing in the downstream direction and the glass near the bottom of the pool flowing in the upstream direction. At the juncture of these two convection cells a strong upwelling of molten glass is produced, and therefore this region is known as the "spring zone." The molten glass near the surface in the spring zone is typically the hottest portion of molten glass in the melting furnace and, therefore, it is desirable that the throughput stream of glass pass through this region to insure thorough melting and refining of the glass. However, this goal is not always attained because the spring zone effect may not be strong enough and because portions of the molten glass may bypass the spring zone. It is an object of the invention to improve the flow of glass through the high temperature regime of the spring zone.

It is well known to use bubblers in glass melting furnaces to agitate the molten glass and to control circulation patterns. Examples of bubblers in glass melting furnaces may be seen in U.S. Pat. Nos. 2,890,548 (Wright); 3,294,509 (Soubier et al.); 3,305,340 (Atkeson); 3,330,639 (Boettner et al.); 3,558,297 (Carney et al.). None of the known arrangements, however, provide the degree of flow control in and around the spring zone that is desired. Such an arrangement is provided by the present invention.

SUMMARY OF THE INVENTION

In one aspect of the present invention a glass melting furnace is provided with one or more rows of bubblers extending transversely across the pool of molten glass in the region of the spring zone or slightly upstream therefrom. One or both outboard groups of bubblers (i.e., those adjacent to the side walls of the furnace) are operated with a more vigorous bubbling action than the bubblers in the center portions. The injection of gas into the molten glass causes it to rise, thereby enhancing the spring zone effect. Additionally, the greater bubbling rate in the side wall regions creates an obstacle to downstream flow in that region, thereby preventing molten glass along the side walls from bypassing the spring zone.

In another aspect of the invention, a plurality of transverse rows of bubblers are located in or just upstream of the spring zone. The bubbler tubes of a downstream row terminate at an elevation higher than that of an upstream row. In this manner, the bubbler tubes conform approximately to the flow stream of a portion of molten glass entering the spring zone, and thereby create a cumulative buoyant effect on that portion of the molten glass so as to enhance the spring zone effect. The cumulative effect is the result of a given portion of molten glass having its buoyancy increased by bubbling from the first row of bubblers, and that same portion rising and flowing downstream to have its buoyancy further enhanced by a second row of bubblers. In other words, by providing the bubbler tubes with a contour approximating that of the flow stream, gas is injected a plurality of times into the same portion of glass. The result is an enhanced spring zone effect greater than if the bubblers were at the same elevation.

THE DRAWINGS

DETAILED DESCRIPTION

Figure 1:
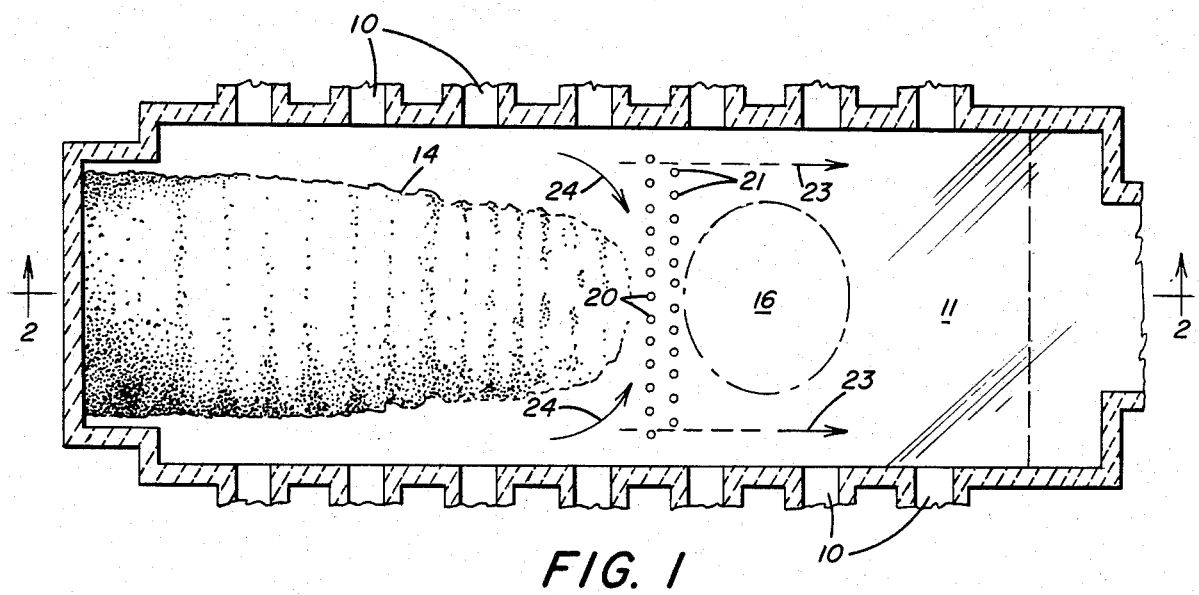
FIG. 1 is a horizontal section of a side port fired glass melting furnace showing a bubbler configuration in accordance with a preferred embodiment of the present invention.
Figure 2:
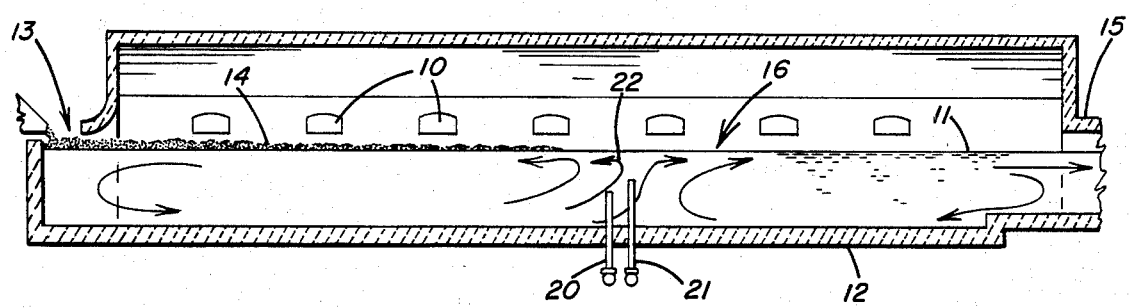
FIG. 2 is a vertical section of the glass melting furnace of FIG. 1 taken along line 2—2 showing a stepped configuration of bubblers.

For purposes of illustration, the invention will be described in conjunction with a side port fired, regenerative furnace of the type typically employed for melting flat glass as shown in FIGS. 1 and 2, but it should be understood that the invention is applicable to other types of glass melting furnaces as well. The furnace depicted in the drawings is provided with seven opposed pairs of firing ports 10, but a furnace of this type may have more than, or fewer than, seven pairs of ports. A pool of molten glass 11 is contained in a refractory basin 12, and additional glass batch materials are fed into the furnace at an inlet opening 13. The batch materials are propelled into the furnace so as to form a floating layer or "blanket" of batch 14 on the surface of the pool 11. In this type of furnace, combustion flames from the ports firing from alternate sides of the furnace provide heat for melting the batch. At the downstream end of the furnace, molten glass is withdrawn from the furnace through a waist 15 which leads to a refiner section and thereafter to a forming process. As depicted in the cross-sectional view of FIG. 2, the convection cell beneath the batch blanket 14 is in a counter-clockwise direction, and the convection cell at the downstream end of the furnace is in a clockwise direction. Where these cells meet is the spring zone 16.

In the embodiment shown, two rows of bubblers, an upstream row 20 and a downstream row 21, are provided. The preferred embodiment employs two rows, but a single row is sufficient for some aspects of the invention. On the other hand, in some cases there may be an advantage in providing three or more rows. The bubbler rows extend transversely across the furnace from one side wall to the opposite side wall. Conveniently, the rows may be substantially linear as shown, but it is not essential that the rows be straight. The end bubblers should be spaced a sufficient distance from the adjacent side wall to avoid excessively accelerating errosion of the side wall due to the agitation caused by the bubbling.

Conventional bubbler tube construction, as is known in the art, may be employed. For example, each bubbler may comprise a ¾ inch (1.9 centimeters) molybdenum tube with a 9/32 inch (7 millimeter) central bore. Each tube extends vertically through the floor of the basin 12 and is connected at its lower end to a source of a gas for bubbling, such as nitrogen or forming gas (a mixture of nitrogen with a small amount of hydrogen).

The number of bubbler tubes will depend upon the width of the particular furnace. A bubbler has an affect on the currents in a region of the molten glass that extends a considerable distance laterally around the bubbler. For example, a typical bubbler of the type described here is found to have an area of influence of about 18 inches (76 centimeters) in diameter. Although the advantages of the invention do not require that the entire throughput stream be affected by the bubblers, the best results are achieved when the bubblers are spaced so as to produce a continuous combined area of influence extending across the full width of the furnace. Preferably, the individual areas of influence are overlapped. Thus, in the example of a bubbler having an 18 inch (46 centimeter) diameter area of influence, a preferred spacing between bubblers may be on the order of about 12 inches (30 centimeters).

The height of the bubblers within the molten pool depends upon a number of factors. The bubblers should terminate a sufficient distance above the refractory bottom of the basin 12 so as to avoid unduly accelerating erosion of the bottom by convection. Because of the high temperatures at the surface of the spring zone, terminating the bubbler tubes a distance below the surface can substantially extend the life of the bubblers. Molybdenum bubblers, for example, have a relatively short life when exposed to temperatures above 2600° F. (1425° C.), and thus it is preferred to locate the upper extremities of the bubbler tubes below the elevation where such a temperature would normally be encountered. Therefore, for these practical considerations it is preferred that the upper ends of the bubbler tubes lie outside the upper one-sixth and the bottom one-sixth of the pool depth, most preferably outside the upper one-quarter, and the bottom one-quarter. Additionally, for optimum effect, it is preferred that the tips of the bubblers be located at or below the "neutral plane." The "neutral plane" is the horizontal plane in the center of the convection cells in the molten glass pool where the flow is neither upstream nor downstream but essentially static. When located at or below the neutral plane the bubblers exert their upward entrainment effect on the maximum portion of the upper flow stream. For example, in a furnace having a glass depth of about 60 inches (1.5 meters) it is preferred that the tips of the burner lie within 15 inches to 35 inches (38 centimeters to 89 centimeters) from the surface of the glass. In another specific example, a glass pool 53 inches (135 centimeters) deep may be provided with one row of bubblers 30 inches (76 centimeters) below the glass surface, and a second row of bubblers downstream from the other row 20 inches (51 centimeters) below the glass surface.

When employing two or more rows of bubblers the rows need not be spaced so close as to overlap their areas of influence as in the case of lateral spacing between bubblers, but the spacing between rows should be sufficiently close to take advantage of the cumulative affect. A spacing of about 18 inches to 24 inches (46 centimeters to 61 centimeters) has been found suitable for typical large flat glass furnaces. In order to obtain the cumulative effect of two or more injections of gas into the same glass stream, the tips of the bubblers should lie approximately parallel to a flow path of glass in the spring zone. For example, as shown in FIG. 2, the tips of bubblers 20 and 21 conform to the flow stream 22 which has both an upward and downstream component. Because the downstream row 21 is taller than the upstream row 20, a given portion of glass flowing along the flow stream 22 would first have gas injected into it from the row of bubblers 20 and would then flow into the vicinity of the tips of the downstream row of bubblers 21 where the same portion would be further injected with gas directly. The precise location of the bubbler tips would, of course, depend upon the circulation patterns of a particular melting operation, and may vary somewhat even in a particular furnace, depending upon the operating conditions. In this embodiment the bubblers are in the upstream convection cell, at its downstream end where the bottom stream is rising into the spring zone. At this location the bubbling enhances the spring zone effect on the upstream side, and therefore reinforces the upstream circulation rate. This, in turn, increases the amount of heat carried by the rearwardly flowing upper glass stream from the hot region at the top of the spring zone under the batch layer, and thereby improves melting effectiveness.

The other aspect of the invention involves differential bubbling rates from side to center so as to induce side portions of the throughput stream to flow into the intensified heating of the central spring zone. As can be seen in FIG. 1, the spring zone 16 is located generally in the central portion of the furnace, leaving paths along the side walls where streams 23 of glass may sometimes pass to the downstream portion of the furnace without passing through the spring zone. Although bubblers per se may assist bringing the throughput stream glass in general to the surface, conventional bubbling does not effectively counter these bypass paths 23. Accordingly, in this embodiment of the invention, a portion of the bubblers near one or more of the side walls inject gas into the region of one or both of the side streams 23 at a rate greater than the rate of bubbling in the center portion of the bubbler row. This may be carried out with one or more rows of bubblers. The end portion effecting the greater bubbling rate may constitute on the order of one third of the bubbler row (or two thirds in those cases where both ends are subjected to accelerated bubbling at the same time). The more vigorous bubbling at the sides of the furnace just upstream of the spring zone creates a resistance to the throughput stream following the path 23 and instead induces that portion to follow a path 24 toward the center of the spring zone.

The bubbling rate will be determined by the needs of a particular melting operation, but, typically, an individual bubbling tube injects about 0.5 to 10 standard cubic feet per hour (14 to 280 liters per hour). A side bubbler operating at an accelerated rate may inject a volume of gas on the order of 10 to 200 percent greater than that of an individual bubbler in the center. Preferably a side bubbler injects about a 100 percent greater volume of gas than a central bubbler.

The presence of a bypass flow stream 23 may be transitory and may be present on only a single side of the spring zone. Therefore, the accelerated bubbling rate at the sides may be practiced periodically and only on the side of the furnace where needed. However, the changes in flow patterns involved change relatively slowly over periods of hours or even days, and therefore, the accelerated side bubbling may be carried out essentially continuously during a large number of furnace firing reversals.

The above example has been described in detail in order to illustrate a specific, preferred embodiment of the invention, and it should be understood that variations as are known to those of skill in the art are included within the scope of the invention as defined by the claims which follow.

We claim:

1. A method of melting glass comprising feeding a layer of glass batch materials onto a pool of molten glass at an upstream end of a furnace, withdrawing molten glass at a downstream end of the furnace longitudinally spaced from the upstream end, providing heat to the furnace above the pool of molten glass so as to melt the glass, whereby a zone of rising glass currents is established in the pool between the downstream end of the batch layer and the downstream end of the furnace, on the upstream side of the zone of rising glass currents injecting gas into the molten glass at a plurality of locations extending transversely across the furnace so as to enhance the rising glass currents, the gas injection in at least one transverse side portion being sustained at a volume rate at least ten percent greater than the rate of gas injection in central portions of the furnace.

2. The method of claim 1 wherein the gas injection at said one transverse side portion is at a rate 10 to 200 percent greater than the rate of gas injection at central portions of the furnace.

3. The method of claim 1 wherein said one transverse side portion constitutes about one third of the width of the furnace.

4. The method of claim 3 wherein the rate of gas injection in said one transverse side portion is 10 percent to 200 percent greater than the rate of injection at center portions of the furnace.

5. The method of claim 1 wherein the gas is injected into the glass from tubes extending vertically into the molten glass pool from the bottom of the furnace, and the injection takes place from the tubes at an elevation spaced at least one sixth of the glass depth from the surface of the molten glass pool and at least one sixth of the glass depth from the bottom of the molten glass pool.

6. The method of claim 1 wherein the plurality of locations at which gas is injected constitute a plurality of rows extending transversely across the furnace.

7. The method of claim 6 wherein the plurality of rows at which gas is injected include an upstream row and a downstream row, and the injection in the downstream row is at a higher elevation than the injection in the upstream row.

8. The method of claim 1 wherein the combustion heat is provided to the furnace by way of a plurality of ports spaced apart along the sides of the furnace.

9. The method of claim 1 wherein the gas injected consists essentially of nitrogen.

* * * * *